United States Patent [19]

Kazuomi et al.

[11] 4,283,681
[45] Aug. 11, 1981

[54] SYSTEM FOR DETECTING AN UNDERWATER BURIED CABLE

[75] Inventors: Yamamura Kazuomi, Yokohama; Fukui Takasuke, Tokyo; Iwamoto Yoshinao, Fujimi; Shirasaki Yuichi, Tokyo; Fujise Masayuki, Yamato; Sugimoto Hikoaki, Mitaka; Shirai Kikuo, Chofu; Yoshida Minoru, Yokohama, all of Japan

[73] Assignee: Kokusai Denshin Denwa Co., Ltd., Tokyo, Japan

[21] Appl. No.: 10,798

[22] Filed: Feb. 9, 1979

[30] Foreign Application Priority Data

Feb. 16, 1978 [JP] Japan ................... 53-15950
Mar. 9, 1978 [JP] Japan ................... 53-26035
May 6, 1978 [JP] Japan ................... 53-53308

[51] Int. Cl.³ .................. G01V 3/11; G01V 3/165; B63B 21/66; F16L 1/00
[52] U.S. Cl. ................... 324/326; 114/254; 254/269; 324/239; 367/106; 405/160
[58] Field of Search ............... 324/326–329, 324/345, 67, 239, 240–243; 367/15, 19, 106, 130; 405/157–160, 175, 154; 114/253, 254; 192/8 A; 242/86.63, 86.64, 86.7, 99; 254/269

[56] References Cited

U.S. PATENT DOCUMENTS

| | | | |
|---|---|---|---|
| 2,238,072 | 4/1941 | Nelson et al. | 324/326 X |
| 2,629,027 | 2/1953 | Platt | 367/130 X |
| 3,282,568 | 11/1966 | Shuster | 367/106 X |
| 3,648,282 | 3/1972 | Kelly | 405/157 X |
| 3,831,545 | 8/1974 | Cain | 114/254 X |
| 3,907,136 | 9/1975 | Christides et al. | 324/67 X |
| 3,926,137 | 12/1975 | Johnson | 367/130 X |
| 4,130,791 | 12/1978 | Slough et al. | 324/326 |
| 4,184,209 | 1/1980 | Crist | 114/253 X |

*Primary Examiner*—Gerard R. Strecker
*Attorney, Agent, or Firm*—Robert T. Gammons

[57] ABSTRACT

A cable detecting system with a cable ship, a cable detector towed by said cable ship via a towing wire and said cable detector dredging the water bottom to find a buried cable, has been improved. When the cable detector detects a buried cable, and the cable is engaged with the cable detector, the towing wire between the cable ship and the cable detector is released either by drawing out a wire from the cable ship or by extending an auxiliary wire from the cable detector, thus, the cable detector stops just when a cable is detected, even when the cable ship continues to move by inertia, and no damage is caused to the cable. The presence of a cable is sensed either through a mechanical means which detects the cable by contact between the cable and the detector, or through electromagnetic means. The detection of a cable triggers the above release of the towing wire.

12 Claims, 23 Drawing Figures

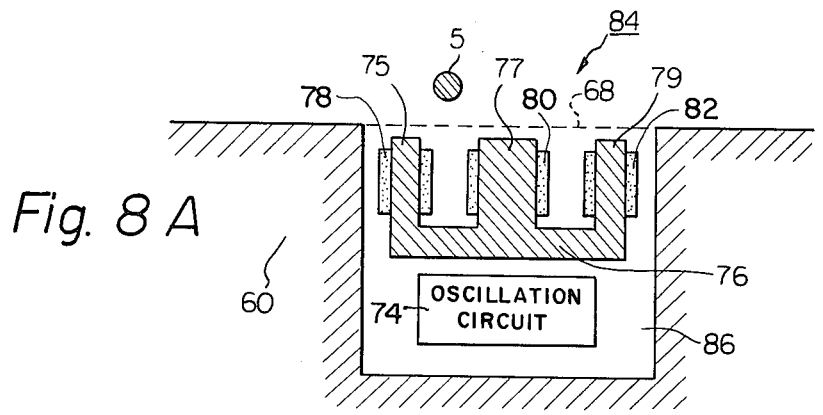
Fig. 8A
Fig. 8B
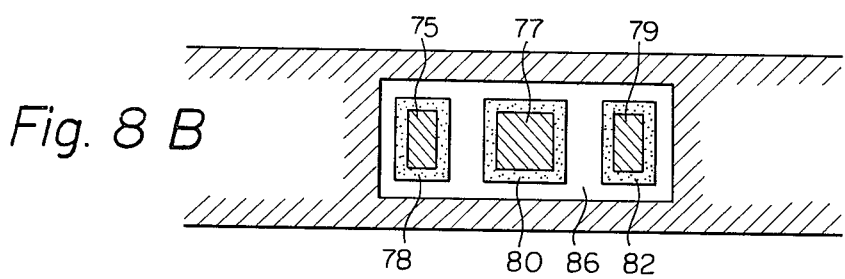
Fig. 8C
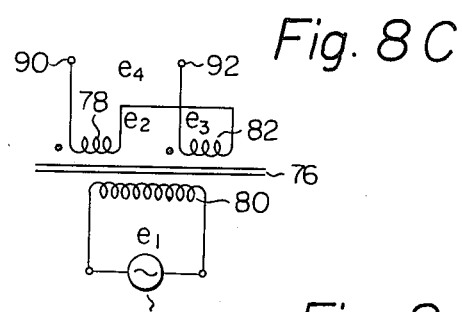
Fig. 8D  Fig. 8E
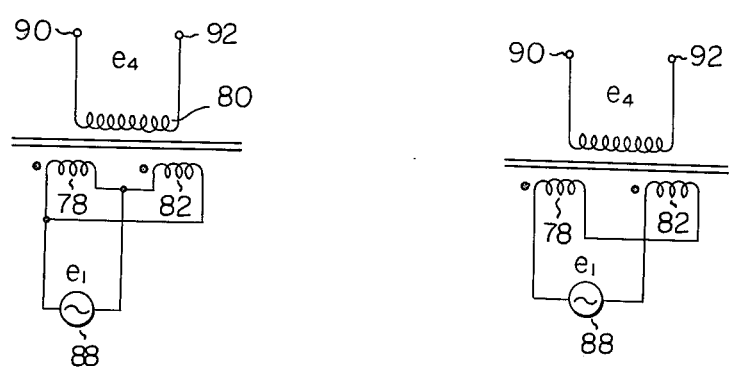

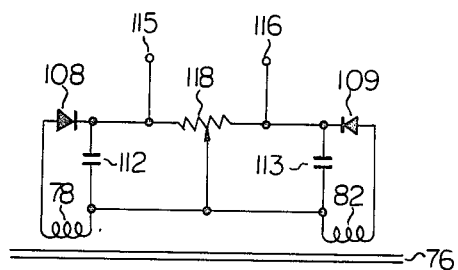
Fig. 13
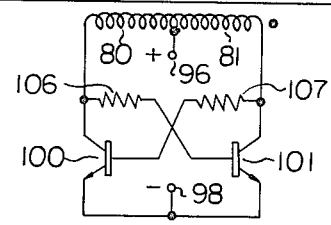
Fig. 14
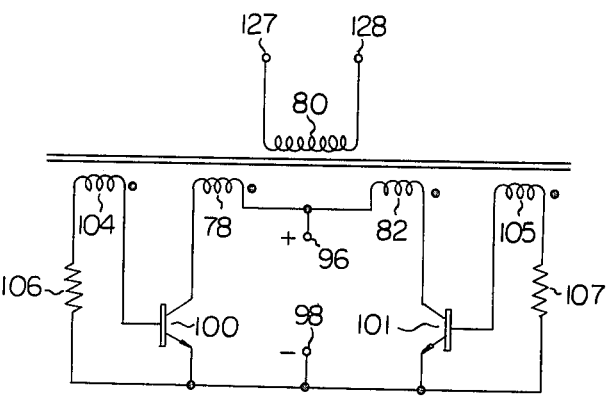
Fig. 15
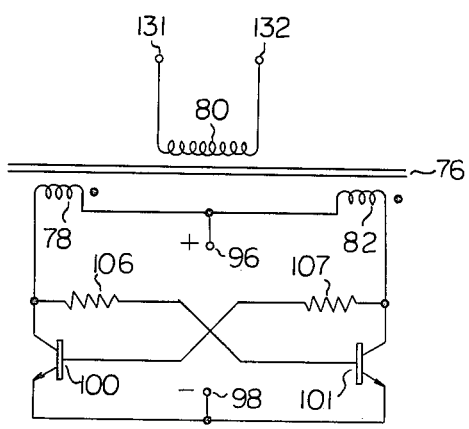

SYSTEM FOR DETECTING AN UNDERWATER BURIED CABLE

BACKGROUND OF THE INVENTION

The present invention relates to a cable detecting system in which a submarine cable buried in a sea bottom is detected and repaired.

When there is something wrong with a cable buried in the bottom of the sea or a lake or a river, it must be raised to a cable ship for repair. Since a cable is buried in the sea bottom, a hook with an arm which can dredge the sea bottom is pulled by a cable ship in the approximate perpendicular direction to the cable, and said hook can detect the presence of a cable and raise the detected cable to a cable ship. In this case an operator on a cable ship monitors the tension of a rope for pulling said hook, and by the increase of tension he can recognize that the hook has engaged a cable, then the operator stops the cable ship and raises the cable by winding up the hook. However, since a cable is buried in the sand or the mud in the sea bottom, the hook sometimes breaks the cable unless the cable ship is promptly stopped just when the hook detects the cable, and in this case the cable cannot be raised. In order to solve this problem, in a prior art, a cable ship moves very slowly towing the hook and when the hook detects the cable, the towing is promptly stopped.

However, since a cable ship has high inertia, it can not stop promptly just when the hook detects a cable, and there has been just possibility of breaking the cable when engaged by the hook. Further, the tension change when the hook detects the cable is difficult to discriminate from the change of tension when the property of the and/or sand in the sea bottom varies. Accordingly, it has been very difficult to detect and raise a buried cable, and the improvement has been desired.

SUMMARY OF THE INVENTION

It is an object, therefore, of the present invention to overcome the disadvantages and limitations of a prior cable detecting system by providing a new and improved cable detecting system.

It is also an object of the present invention to provide a cable detecting system in which a cable is detected without any damage to the cable.

The above and other objects are attained by a cable detecting system having a cable ship, a cable detector towed by the cable ship via a towing wire, said cable detector dredging the water bottom to find a buried cable, said cable detector having a cable sensor of either a mechanical principle or an electromagnetic principle to generate an electric signal upon detecting the presence of a cable, and means for releasing the tension of the towing wire upon detection of a cable being provided either on the cable ship or in the cable detector.

BRIEF DESCRIPTION OF THE DRAWINGS

The foregoing and other objects, features, and attendant advantages of the present invention will be appreciated as the same become better understood by means of the following description and accompanying drawings wherein;

FIG. 8(A) and FIG. 8(B) show another embodiment of a cable sensor according to the present invention, FIG. 8(C) is the circuit diagram of a cable sensor utilized in connection with the structure in FIG. 8(A) and FIG. 8(3)

FIG. 8(D) is another circuit diagram of a cable sensor,

FIG. 8(E) is still another circuit diagram of a cable sensor,

FIG. 13 is still another circuit diagram of a cable sensor,

FIG. 14 is still another circuit diagram of a cable sensor, and

FIG. 15 is still another circuit diagram of a cable sensor according to the present invention.

DESCRIPTION OF THE PREFERRED EMBODIMENTS

Figure 1A:
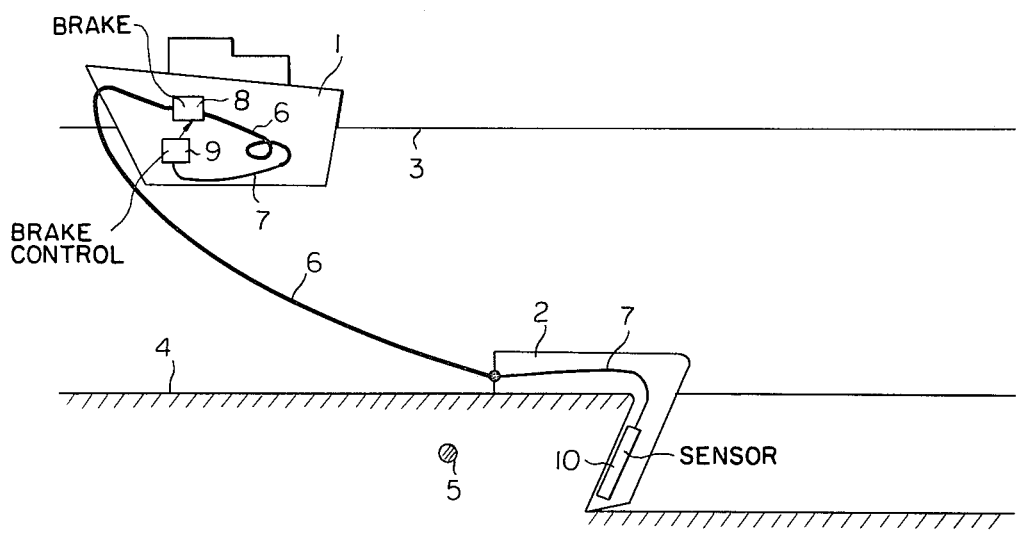
FIG. 1(A) shows the explanatory drawing of searching for a submarine cable according to the present invention.
Figure 1B:
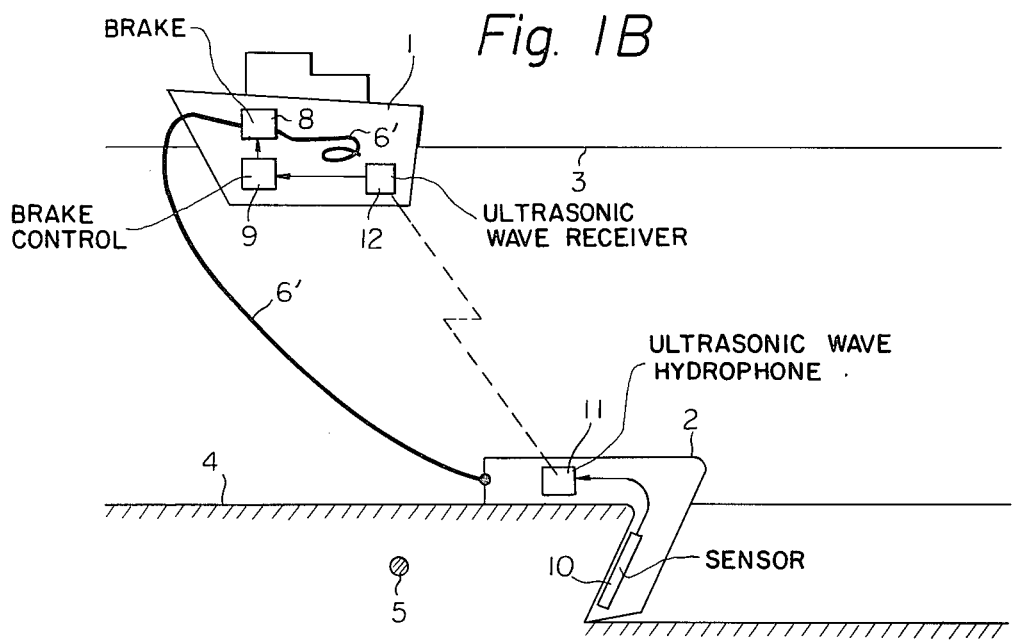
FIG. 1(B) is another drawing of searching for a submarine cable according to the present invention.

FIG. 1(A) and FIG. 1(B) show the embodiment of the present invention in which a cable is detected by a cable detector. In the figures, the reference numeral 1 is a cable ship, 2 is a cable detector, 3 is a sea surface, 4 is a sea bottom, 5 is a cable to be detected buried under the sea bottom, 6 is a towing wire, 7 is a signal wire, 8 is a brake for holding a towing wire 6, 9 is a brake control for controlling the brake 8, 10 is a cable sensor which detects the presence of a cable. The cable ship 1 moves in the direction approximate perpendicular to the cable 5 slowly, and tows the cable detector 2 via the towing wire 6. When the cable 5 is detected by the cable detector 2, the sensor 10 generates a signal which is transmitted to the cable ship 1 through the signal wire 7 in the towing wire 6 and operates the brake control 9 to release the brake 8, and then, the towing wire is released and the towing of the detector 2 is stopped. Then, holding the towing wire without applying tension thereto, the cable ship 1 moves just above the cable detector 2, and winds up the wire 6 to lift the cable detector 2 and the cable 5 on the ship 1 to repair the cable. FIG. 1(B) shows the modification of FIG. 1(A), and the reference numeral 6' shows the towing wire which has no signal wire, 11 is an ultrasonic wave hydrophone which is energized by the output of the sensor 10, and 12 is an ultrasonic wave receiver. In FIG. 1(B), when the sensor 10 detects the presence of a cable, the sensor energizes the ultrasonic wave hydrophone 11, and the receiver 12 on the cable ship 1 recognizes said presence of the cable, and then, the brake control 9 is energized to release the brake 8, then the towing wire 6' is released to stop the movement of the cable detector 2. Thus, the cable 5 can be raised to the cable ship 1 without damaging the cable.

Figure 2:
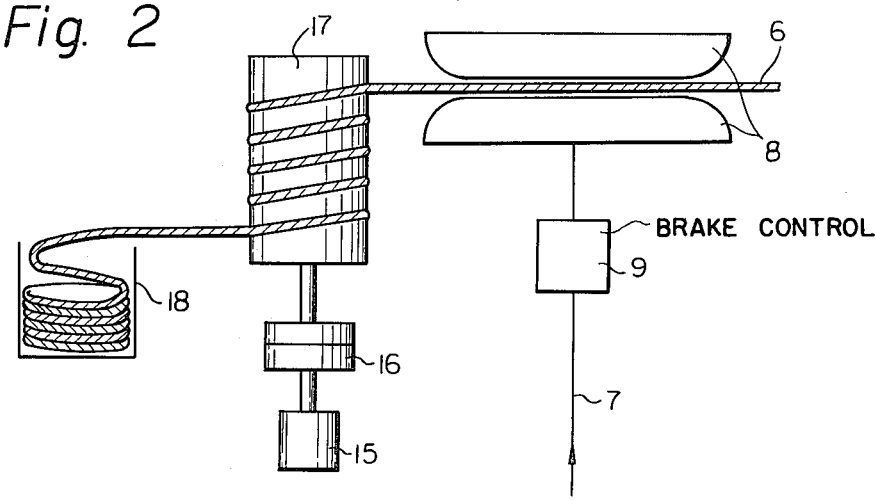
FIG. 2 is an enlarged view of the main portion of FIG. 1(A) and FIG. 1(B)

FIG. 2 shows the detailed structure of the devices around the brake 8 in FIG. 1(A) and FIG. 1(B), and the same reference numerals as those in FIGS. 1(A) and 1(B) show the same members. In FIG. 2, the reference numeral 15 is a motor, 16 is a clutch/gear assembly box, 17 is a cable drum, 18 is a tank for containing the towing wires. As mentioned before, 6 is a towing wire connected to the cable detector 2, 7 is a signal wire, 8 is a brake, 9 is a brake control. In FIG. 2, when the cable detector 2 is lowered to the sea bottom, the clutch 16 connects the drum 17 with the motor 15, and the towing wire 6 is drawn out from the tank 18, on the condition that the brake 8 is released. When the towing wire is drawn out enough, the brake 8 is operated and the towing wire 6 is clutched by the brake 8, then the clutch 16 is released to free the drum 17 in either revolutional direction. The cable ship 1 tows the cable detector 2 with the above status.

When the cable is detected by the sensor, the sensor 10 generates an electrical signal which is transmitted to the cable ship 1 through the signal wire 7 or the ultrasonic wave path. Then, the brake control 9 releases the brake 8. It should be appreciated that the drum 17 is free at this time, that is to say, the clutch 16 is released, then, the towing wire 6 is freely drawn out from the tank 18 until the cable ship 1 stops, and the tension of the towing wire 6 is reduced. As a result, the cable detector 2 stops promptly just when the cable is detected, and thus, the cable is never damaged. After that, the cable 6 is raised to the cable ship 1 by energizing the clutch 16 which connects the motor 15 with the drum 17, and winding up the towing wire 6 in the tank 18. During the operation of lifting the detector by winding up the towing wire, the brake 8 is released.

Figure 3A:
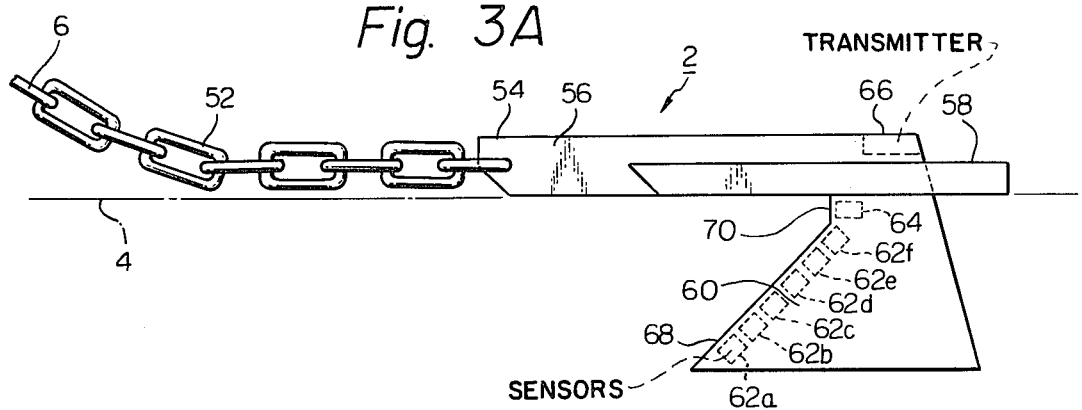
FIG. 3(A) and FIG. 3(B) show the structure of the cable detector according to the present invention.
Figure 3B:
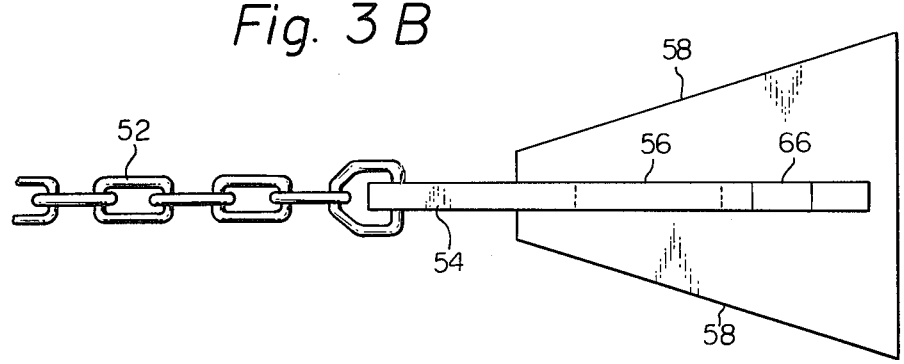

FIG. 3(A) and FIG. 3(B) show the embodiment of the cable detector 2, in which FIG. 3(A) is an elevation view, and FIG. 3(B) is a plane view. It is supposed that the cable detector 2 is towed by the towing wire 6 and dredges the sea bottom 4. The iron chain 52 is provided in order to keep the head 54 of the detector 2 on the sea bottom, and so the length and the weight of the chain 52 must be appropriately designed. The cable detector 2 comprises the body 56, the horizontal stabilizer wing 58, and the blade 60 for cutting or dredging the sea bottom. The stabilizer wing 58 stabilizes the posture of the detector 2 and the blade 60 dredges the sea bottom normally. The blade 60 has sensors 62a through 62f and 64 along the edge of the blade 60. The body 56 has a transmitter 66 for transmitting the signal from the sensor to the cable ship.

The sensors 62a through 62f and 64 are to detect the presence of a cable. Those sensors operate either mechanically or electro-magnetically. The detailed structure and operation of the sensors will be described later.

Figure 4:
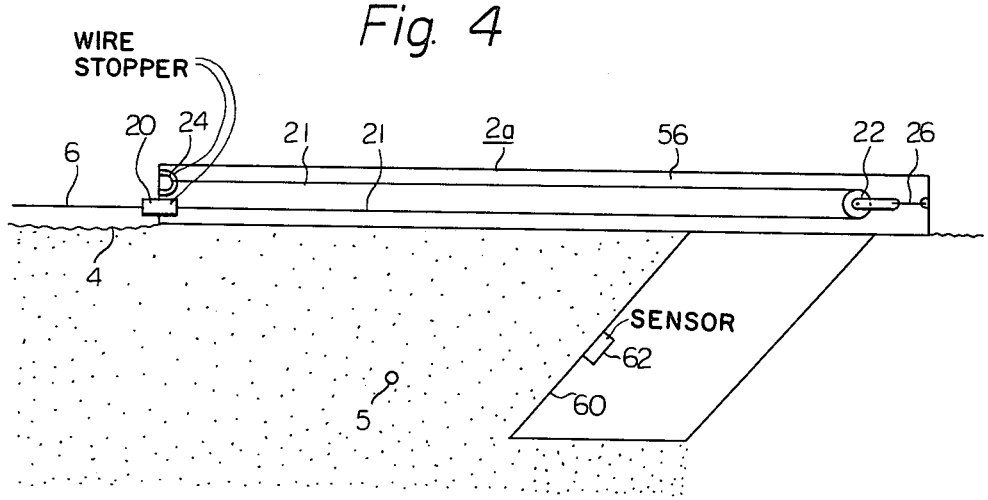
FIG. 4 shows another cable detector according to the present invention.

FIG. 4 shows another embodiment of the cable detector according to the present invention, in which a towing wire is released in the cable detector itself.

In the figure, the cable detector 2a comprises a body 56, a blade 60 extending beneath the body, a sensor 62 provided along the blade 60, a wire stopper 20 provided at the front portion of the body 56, a pulley 22 provided at the rear portion of the detector through the fixed wire 26 whose allowable maximum tension is lower than that of the towing wire 6, an auxiliary wire stopper 24 provided in the front portion of the detector, and an auxiliary wire extending from the auxiliary wire stopper 24 through the pulley 22 to the wire stopper 20. Said auxiliary wire 21 operates as an extension of the towing wire 6 when a cable is detected.

The cable detector 2a is towed by the towing wire 6 and dredges the sea bottom 4 in order to detect a cable 5. When the cable 5 is detected, the sensor 62 generates a mechanical or electrical signal. The wire stopper which is fixed on the detector 2a in normal status, releases the towing wire when the sensor 62 generates a signal.

The operation of the cable detector 2a in FIG. 4 is as follows. When the cable is detected the sensor 62 generates a signal, which has the wire stopper 20 release the towing wire 6. Accordingly, the tension of the towing wire 6 is directly applied to the auxiliary wire 21, and then, the fixed wire 26 whose allowable maximum tension is lower than that of the towing wire is broken. Since the wire stopper 20 is released, the auxiliary wire 21 can extend from the detector 2a, thus, the towing wire 6 has an extension the length of the auxiliary wire 21. Since the auxiliary wire 21 operates as an extension of the towing wire, the tension of the towing wire 6 is reduced and then the cable detector 2a is stopped.

The decrease of tension of the towing wire 6 is also detected on the cable ship 1, which also draws out the necessary length of towing wire and said cable ship stops. By providing said extension of the towing wire either from the cable detector itself or the cable ship 1, the cable detector 2a can stop promptly when the cable is detected, thus, the detected cable can be raised to the ship without damage.

Measuring of the tension of the towing wire on the cable ship can be performed in a conventional manner. For instance, a tension meter called a dynamometer can be utilized for the present purpose. Further, the towing wire can be drawn out using the structure mentioned in FIG. 2 upon detection of the decrease of the tension of the towing wire.

Figure 5:
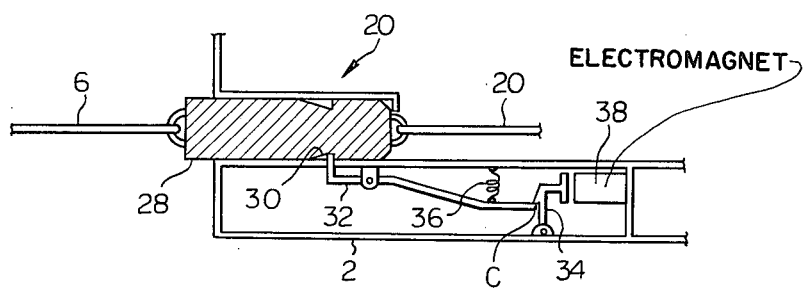
FIG. 5 shows the structure of a wire stopper in FIG. 4.

FIG. 5 shows the detailed structure of the wire stopper 20 described in FIG. 4. In FIG. 5, the block 28 is made of rigid metal, such as iron, and has a circular or rectangular cross section with an asymmetrical groove 30 around the center of the block. The trigger 32 is engaged with said groove 30 and operates as a stopper so that the block 28 does not extend even when tension is applied to the towing wire 6. The spring 36 is shown in extended form, and has the auxiliary trigger 34 engage with the extreme end of the trigger 32 to hold the trigger 32 at the position shown in the figure. The electromagnet 38 is energized upon receipt of the signal from the sensor, and attracts the auxiliary trigger 34 to release the connection C between the auxiliary trigger 34 and the extreme end of the trigger 32. Accordingly, the spring 36 is contracted and releases the trigger 32 from the groove 30, then, the block 28 is drawn out of the detector by the tension of the towing wire 6.

Although FIG. 5 shows the embodiment which releases the wire stopper mechanically using a spring and an electromagnet, another embodiment which releases the wire stopper using the explosive energy of an explosive powder which is fired by an electrical signal may be possible.

Now, the sensor 62a through 62f and 64 will be described in detail in accordance with FIGS. 6(A) through 15.

Figure 6A:
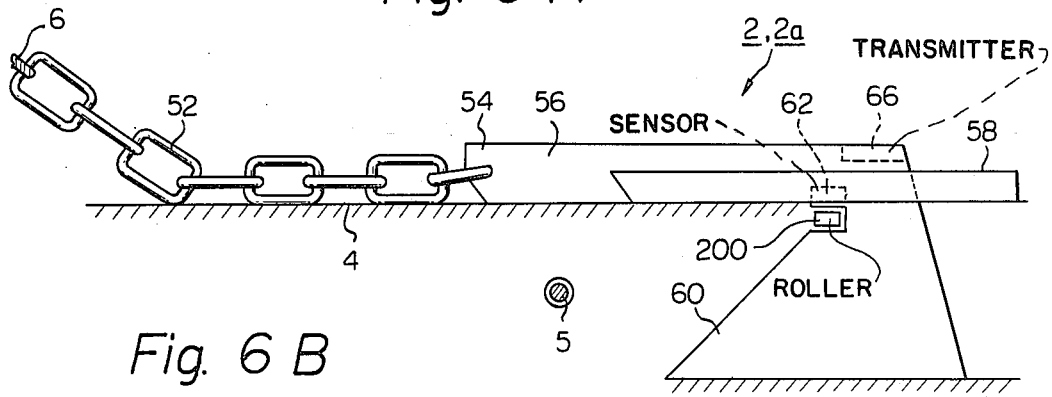
FIG. 6(A) shows the structure of one embodiment of a cable sensor according to the present invention.

First, a mechanical sensor will be explained in accordance with FIGS. 6(A), 6(B) and 6(C). In FIG. 6(A), the same reference numerals as those in FIGS. 3(A) and 3(B) show the same members as those in the previous figures, and 200 is a roller, 62 is a cable sensor which is shown in FIG. 6(B) in detail.

Figure 6B:
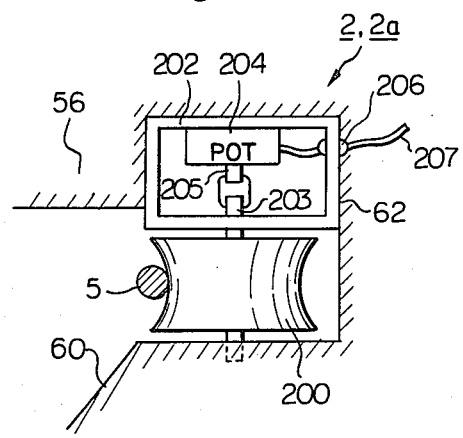
FIG. 6(B) is the enlarged view of the main portion of FIG. 6(A)

In FIG. 6(B), the water tight container 202 is fixed in the body 56 of the cable detector 2 or 2a, and receives the shaft 203 which transmits the revolution of the roller 200. 204 is a potentiometer, the shaft 205 is engaged with the shaft 203. Therefore, the potentiometer 204 generates an electrical signal according to the revolution of the roller 200. The use of a roller 200 is effective to prevent the damage of a cable. The electrical output from the potentiometer 204 is applied to the signal line 207 through the water tight terminal 206. It should be appreciated that the roller 200 rotates in either direction when a cable 5 contacts with roller 200, unless the moving direction of the detector is exactly perpendicular to a cable. The revolution of the roller indicates the presence of a cable and provides the electrical signal on the signal line 207. Further, it should be noted that some modifications that the potentiometer is replaced by a variable capacitor or a rotary machine like a synchromotor are possible.

Figure 6C:
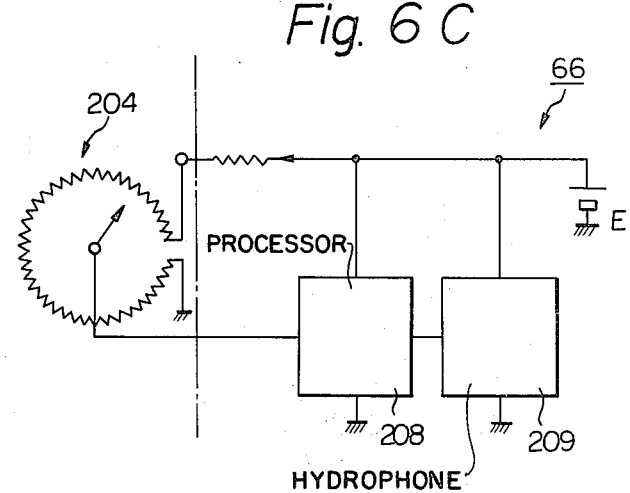
FIG. 6(C) is the circuit diagram utilized together with the cable sensor in FIG. 6(A)

FIG. 6(C) shows the blockdiagram of the transmitter 66 in FIG. 3(A), and the transmitter 66 comprises the detected signal processor 208 which processes the detected signal from the sensor, an ultrasonic wave hydrophone 209 which converts the electrical information concerning the detection of a cable to an ultrasonic wave, and a battery E for supplying the electrical power to the above mentioned units. The processor 208 can be implemented by a modulator which converts the rotational angle of the potentiometer to a voltage, and an amplifier, or alternatively, by converting the rotational angle of the potentiometer to a resistance, and controlling the oscillating frequency of an oscillator according to the change of said resistance.

Figure 7:
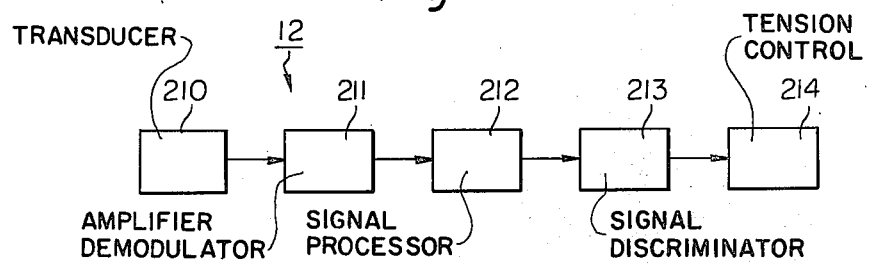
FIG. 7 is a block diagram of a detected signal receiver installed on a cable ship.

FIG. 7 shows a blockdiagram of an ultrasonic wave receiver 12 in FIG. 1(B) installed on the cable ship 1. The receiver 12 comprises a receiving transducer 210, an amplifier/demodulator 211, a signal processor 212, a detected signal discriminator 213, and a tension control 214. The sensed signal transmitted through the ultrasonic wave energy in the sea from the detector 2 is converted to an electrical signal in the receiving transducer 210 which is installed in the sea beneath the bottom of the cable ship. Said electrical signal is applied to the detected signal discriminator 213 through the amplifier/demodulator 211 and the signal processor 212. When the discriminator 213 recognizes the presence of the cable, the tension control 214 is triggered to release the towing wire, and then the tension of the towing wire is lowered to almost zero in a short time.

Now, other embodiments of the sensor which detect the presence of a cable through an electromagnetic process will be explained.

FIG. 8(A) through FIG. 8(E) show other embodiments of a cable sensor according to the present invention, and those sensors detect the presence of a cable through an electromagnetic medium. FIG. 8(A) shows the cross sectional view of the cable sensor in which a core 76 made of ferromagnetic material, coils 78, 80 and 82, and an oscillation circuit 74 compose a cable sensor 84 (which corresponds to 62a through 62f or 64 in FIG. 3), and the cable sensor 84 is mounted in the balde 60 of the cable detector.

FIG. 8(B) shows the plane sectional view of the blade 60. The core 76 is in an E-shaped form comprising a center leg 77, and a pair of side legs 75 and 79. The center leg 77 has a coil 78, and a pair of side legs 75 and 79 have coils 78 and 82, respectively. The connection between each coil and the structure of the oscillation circuit 74 will be described later.

FIGS. 8(C), 8(D) and 8(E) show the principle circuits of a cable sensor. As mentioned before, the cable sensor is mounted in the blade of a cable detector, and is protected from the external mud and sand by inserting an insulating mold material 86 like epoxy resin. Generally, the blade 60 of a cable detector is made of iron which is a ferromagnetic material. However, since the edge 68 of the blade is made of non-magnetic material, the operation of the sensor is not affected although the cable detector itself is made of iron. In FIG. 8(C), when the coil 80 is supplied an alternate signal $e_1$ from the alternate signal source 88, voltages $e_2$ and $e_3$ are induced on the coils 78 and 82, respectively. In FIG. 8(C), it is supposed that the coil 78 is in a symmetrical position with the coil 82 in relation to the coil 80, and then, the absolute value of $e_2$ is equal to the absolute value $e_3$. Accordingly, taking into consideration the polarity of the coils as indicated by the dot in FIG. 8(C), the voltage $e_4$ between the terminals 90 and 92 is the difference between $e_2$ and $e_3$, and is almost zero. Next, when a cable 5 is near the cable sensor as shown in FIG. 8(A), the electromagnetic condition between the coils 78 and 80 is affected by the presence of the cable 5, and the voltage $e_2$ and/or $e_3$ changes. Accordingly, the voltage $e_4$ does not remain zero but becomes a positive or negative value, which can be an indication signal of the presence of a cable. It should be appreciated that when some magnetic debris is included in the sea bottom, the cable sensor might respond to the magnetic debris, but since the magnetic debris gives the same change to the voltage $e_2$ as that of the voltage $e_3$, those changes are cancelled and the voltage $e_4$ is not affected by the presence of magnetic debris in the sea bottom.

FIG. 8(D) shows another embodiment of the cable sensor, in which the coil 78 is wound on the leg 75 of the core 76, the coil 82 is wound on the leg 79, and the coil 80 is on the leg 77. The feature of FIG. 8(D) is that an exciting signal $e_1$ from the alternate signal source 88 is applied to the parallel coils 78 and 82 simultaneously. Therefore, the output voltage $e_4$ is the sum of the voltage induced from the coil 78 and the voltage induced from the coil 82, and since the coil 78 is in a symmetrical position to the coil 82 in relation to the coil 80, and the polarity of those coils is designed as indicated by the dot in the figure, the voltage $e_4$ between the terminals 90 and 92 is the difference between the two induce voltages, and $e_4$ is usually zero. And when a cable approaches the cable sensor, the electromagnetic status between the coils 78, 80 and 82 is changed, and the voltage $e_4$ does not remain zero but provides some positive or negative value.

FIG. 8(E) is another embodiment of the cable sensor according to the present invention, in which the structure of the core 76 and the coils is the same as that shown in FIG. 8(D). The feature of FIG. 8(E) is that the coils 78 and 82 are serially connected, and the alternate signal $e_1$ from the alternate signal source 88 is applied to those differential coils. Accordingly, the voltage $e_4$ is changed by the presence of a cable 5 and provides the indication signal of a cable.

Figure 9:
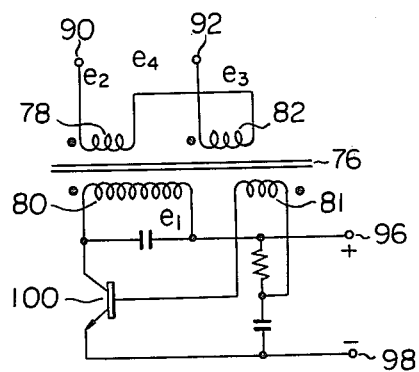
FIG. 9 is still another circuit diagram of a cable sensor.

FIG. 9 shows still another embodiment of a cable sensor according to the present invention. In the figure, the coil 81 is wound on the leg 77 of the core 76, and the coil 81 is a component of an oscillation circuit with a transistor 100 together with a coil 80. In the figure, when a direct voltage (DC) is applied between the terminals 96 and 98, the circuit oscillates at a predetermined frequency, and provides an alternate signal $e_1$ to the coil 80. Accordingly, as mentioned in FIG. 8(C), the cable detection signal is obtained between the terminals 90 and 92.

Figure 10:
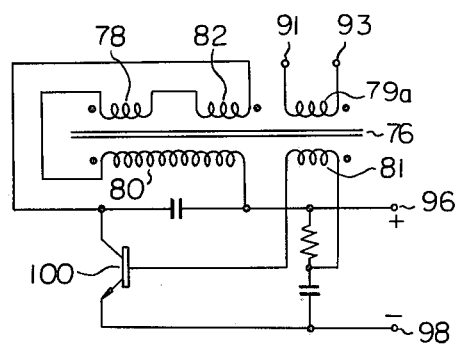
FIG. 10 is still another circuit diagram of a cable sensor.

FIG. 10 is the modification of the embodiment of FIG. 9. In the figure, the coil 79a is wound on the leg 77 of the core 76 in FIGS. 8(A) through 8(E). The oscillation circuit in this embodiment comprises a transistor 100 and the coils 78, 80, 81 and 82, and it is supposed that the polarity of the coils 78 and 82 is designed as indicated by the dot, thus the effect of the coil 78 on the coil 80 is cancelled by the effect of the coil 82 on the coil 80. Accordingly, when a direct voltage (DC) is applied between the terminals 96 and 98, and the circuit is in the oscillation condition, the oscillating frequency is changed by the presence of a cable to be detected near the coils 78 and/or 82. The output of the circuit is provided on the terminals 91 and 93, and the change of the frequency between those terminals indicates the presence of a cable.

Figure 11:
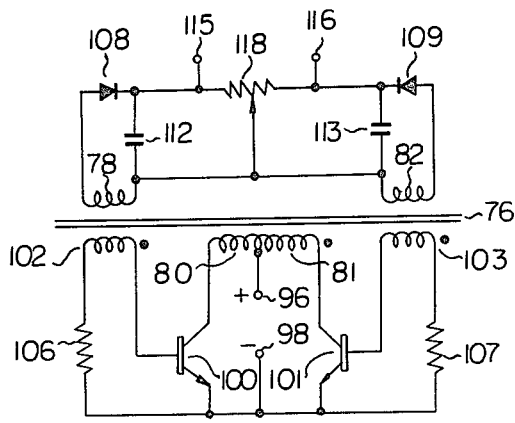
FIG. 11 is still another circuit diagram of a cable sensor.

FIG. 11 shows still another embodiment of the cable sensor according to the present invention. In the figure, the coils 80 81, 102 and 103 are wound on the center leg 77, and the oscillation circuit comprises those four coils 80, 81, 102 and 103, a pair of transistors 100 and 101, and resistors 106 and 107. The coils 78 and 82 are wound on the side legs as shown in FIG. 8(A) and FIG. 8(B), and the output of those coils 78 and 82 is connected to the output terminals 115 and 116 through a pair of rectifier diodes 108 and 109, and a pair of filter capacitors 112 and 113. The circuit oscillates upon application of a direct voltage (DC) to the terminals 96 and 98. It is supposed that the circuit is so designed that the output of the coil 78 is cancelled by the output of the coil 82, so the voltage between the terminals of the capacitor 112 is the same as that of the capacitor 113, and no voltage appears on the output terminals 115 and 116. When a small voltage appears between the output terminals 115 and 116, due to a small error or unbalance of the circuit, said small error voltage is cancelled by adjusting the variable resistor 118, and so the output voltage between the output terminals 115 and 116 is zero when there is no cable. When a cable to be sensed approaches to the sensor, the voltage on the coil 78 and/or the coil 82 changes, and thus, the output voltage between the output terminals 115 and 116 is changed and the cable detection signal is obtained on the terminal 115 and 116.

Figure 12:
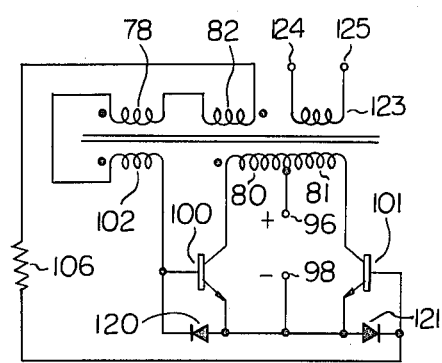
FIG. 12 is still another circuit diagram of a cable sensor.

FIG. 12 shows still another embodiment of the cable sensor according to the present invention. Similar to the embodiment in FIG. 11, the coils 80, 81, 102 and 103 are wound on the center leg 77 in FIGS. 8(A) and 8(B). The coils 78 and 82 are wound on the side legs. It should be appreciated that the coils 78, 82 and 102 compose a positive feedback circuit, and the coil 78 is symmetrical with the coil 82, and the polarity of those coils is selected so that the outputs of those coils are cancelled by each other. When a direct voltage (DC) is applied between the terminals 96 and 98, the circuit oscillates at a predetermined frequency. And when a cable to be detected approaches the sensor, the operation of the coil 78 is different from the operation of the coil 82, and then, the oscillating frequency and the oscillating amplitude of the circuit is changed by the presence of the cable. Accordingly, a coil 123 wound on the center leg can provide the output signal at the output terminals 124 and 125 through the change of the output frequency, and indicates the presence of a cable.

FIG. 13 is the modification of the circuit of FIG. 11, and this circuit oscillates at a predetermined frequency when a direct voltage (DC) is applied on the terminals 96 and 98. As explained previously, the effect of the coil 78 is symmetrical with the effect of the coil 82, and when a cable is detected, the output of the coil 78 becomes different from the output of the coil 82, and as a result, a voltage appears between the output terminals 115 and 116 and thus, the presence of a cable is indicated.

FIG. 14 is still another embodiment of the cable sensor according to the present invention. The coils 78 and 104 are wound on the leg 75, and the coils 82 and 105 are wound on the leg 79. These four coils and the transistors 100 and 101, and the resistors 106 and 107 compose an oscillation circuit. The coil 80 is wound on the center leg 77. The circuit oscillates when a direct voltage (DC) is applied to the terminals 96 and 98. Since the circuit is symmetrical in relation to the coil 80, the voltage between the terminals 127 and 128 is usually zero. However, when a cable approaches the sensor, the output of the coil 78 becomes different from the output of the coil 82, and thus, the output voltage appears on the terminals 127 and 128 indicating the presence of a cable.

FIG. 15 shows still another embodiment of the cable sensor according to the present invention. The coil 78 which is provided on the leg 75, the coil 82 which is provided on the leg 79, a pair of resistors 106 and 107, and a pair of transistors 100 and 101 compose an oscillation circuit. The coil 80 is wound on the leg 77 in FIG. 8(A). When a direct voltage (DC) is applied between the terminals 96 and 98, the circuit oscillates at a predetermined frequency. Since the circuit is symmetrical in relation to the coil 80, the output voltage between the terminals 131 and 132 is usually zero. However, when a cable to be detected approaches the sensor, the electromagnetic status between the coils 78 and 80 becomes different from that between the coils 82 and 80, and as a result, an indication signal is obtained on the terminals 131 and 132.

Although the present sensors mentioned in FIGS. 8(A) through 15 provides an output signal only when a cable approaches the sensor, a small output voltage might appear even when no cable is detected due to the error and/or the unbalance of the circuit. A potentiometer of a variable resistor mentioned in FIG. 11 and FIG. 13 can overcome this problem and a balanced output signal is obtained when no cable is detected. Further, another compensation means is possible, for instance, the output voltage $e_4$ is first converted to a direct voltage (DC), which is superimposed with a compensation voltage to provide the balanced output voltage when no cable is detected.

It should be appreciated that the embodiments in FIGS. 10 and 12 provide an indication signal in the form of the change of a freqeuncy, and it should be also appreciated that an indication signal in the form of the change of the amplitude of the voltage is also possible in those embodiments by, for instance, providing the voltage difference between the voltage of the coil 78 and that of the coil 82, to the output circuit shown in the configuration of FIG. 9.

As mentioned above in detail, a buried cable is detected through a mechanical means and/or an electromagnetic means, and when a cable is detected, the tension of a towing wire is released either in a cable ship or in a cable detector itself. Accordingly, a cable can be sensed without damaging the cable itself, and maintenance or repair of a cable can be carried out without difficulty.

From the foregoing it will now be apparent that a new and improved cable detector has been found. It should be understood of course that the embodiments disclosed are merely illustrative and are not intended to limit the scope of the invention. Reference should be made to the appended claims, therefore, rather than the specification as indicating the scope of the invention.

Finally, the major reference numerals referred in the present specification are listed below:

1; cable ship
2,2a; cable detector
3; sea surface
4; sea bottom
5; cable to be detected
6,6'; towing wire
7; signal wire
8; brake
9; brake control
10; sensor
11; ultrasonic wave hydrophone
12; ultrasonic wave receiver
15; motor
16; clutch/gear assembly box
17; cable drum
18; tank
20; wire stopper
21; auxiliary wire
22; pulley
24; auxiliary wire stopper
26; fixed wire
28; metal block
30; groove
32; trigger
34; auxiliary trigger
36; spring
38; magnet
52; chain
54; head of a cable detector
56; body of a cable detector
58; stabilizer of a cable detector
60; blade of a cable detector
62; 62a-62f, 64; sensor
66; transmitter
68, 70; edge of a blade
74; oscillation circuit
75; side leg
76; core
77; center leg
78; coil
79; side leg
79a; coil
80; coil
81; coil
82; coil
86; mold
88; alternate signal source
90; terminal
91; terminal
92; terminal
93; terminal
96; terminal
98; terminal
100; transistor
101; transistor
102; coil
103; coil
104; coil
105; coil
106; resistor
107; resistor
108; diode
109; diode
112; capacitor
113; capacitor
115; terminal
116; terminal
118; variable resistor
123; coil
124; terminal
125; terminal
127; terminal
128; terminal
131; terminal
132; terminal
200; roller
202; water tight container
203; shaft
204; potentiometer
205; shaft
206; water tight terminal
207; signal line
208; detected signal processor
209; transducer
210; receiving transducer
211; amplifier/demodulator
212; signal processor
213; detected signal discriminator
214; tension control.

What is claimed is:

1. A cable detecting system comprising a cable ship, a cable detector having at least a body and a blade fixed to said body for dredging a sea bottom, a towing wire connected between said cable ship and said cable detector for towing the cable detector, a signal wire provided between said cable ship and said cable detector, and said cable detector dredging the water bottom to find a buried cable characterized in that said cable detector has a cable sensor which generates an electrical signal upon detection of the presence of a cable, said electrical signal is transmitted to said cable ship through said signal wire in said towing wire, said cable ship has at least a brake for selectively holding the towing wire and a brake control for controlling the operation of said brake in response to said electrical signal, and said brake control automatically has the brake release the towing wire upon receipt of said electrical signal to stop the cable detector and avoid damage to the detected cable.

2. A cable detecting system according to claim 1 wherein said cable sensor comprises a roller rotatably fixed to the body of the cable sensor so that the roller rotates when a cable contacts with the roller, and means for generating an electrical signal according to the rotational angle of said roller.

3. A cable detecting system according to claim 1, wherein said cable sensor comprises an E-shaped magnetic core in the blade of the cable detector, a plurality of coils wound on each leg of said E-shaped core, an oscillation circuit with a semiconductor connected to said coils, said E-shaped core is positioned so that the open end of the core faces with the edge of the blade, and said coils are arranged so that the induced signal on the coils is changed by the presence of a cable near the core.

4. A cable detecting system according to claim 3, wherein the coil wound on the center leg of the core is connected to the oscillation circuit, and another pair of coils wound on the side legs of the core are differentially connected to each other to detect the presence of a cable.

5. A cable detecting system according to claim 3, wherein a pair of coils wound on the side legs of the core are connected to the oscillation circuit, and the coil wound on the center leg of the core induces a differential signal from each of the side coils to indicate the presence of a cable.

6. A cable detecting system according to claim 5, wherein said oscillation circuit is arranged so that the oscillation frequency depends upon the presence of a cable to be detected.

7. A cable detecting system comprising a body, a blade extending beneath the body, a cable sensor mounted at the edge of the blade to generate an electrical signal upon detection of a cable, a wire stopper mounted at the front portion of the body and being connected with a cable ship through a towing wire, an auxiliary wire stopper provided at the front portion of the body, an auxiliary wire extending from said wire stopper to said auxiliary wire stopper through the rear portion of the body, and said wire stopper having means for releasing the auxiliary wire outside the body upon receipt of the electrical signal from said cable sensor.

8. A cable detecting system according to claim 7 wherein said cable sensor comprises a roller rotatably mounted to the body of the cable sensor so that the roller rotates when a cable contacts with the roller, and means for generating an electrical signal according to the rotational angle of said roller.

9. A cable detecting system according to claim 7 wherein said cable sensor comprises an E-shaped magnetic core in the blade of the cable detector, a plurality of coils wound on each leg of said E-shaped core, an oscillation circuit with a semiconductor connected to said coils, said E-shaped core is positioned so that the open end of the core faces with the edge of the blade, and said coils are arranged so that the induced signal on the coils is changed by the presence of a cable near the core.

10. A cable detecting system according to claim 9, wherein the coil wound on the center leg of the core is connected to the oscillation circuit, and another pair of coils wound on the side legs of the core are differentially connected to each other to detect the presence of a cable.

11. A cable detecting system according to claim 9, wherein a pair of coils wound on the side legs of the core are connected to the oscillation circuit, and the coil wound on the center leg of the core induces a differential signal from each of the side coils to indicate the presence of a cable.

12. A cable detecting system according to claim 9, wherein said oscillation circuit is arranged so that the oscillation frequency depends upon the presence of a cable to be detected.

* * * * *